(12) United States Patent
Bruno et al.

(10) Patent No.: US 11,994,088 B2
(45) Date of Patent: May 28, 2024

(54) AMBIENT AIR ENVIRONMENTAL CONTROL SYSTEM

(71) Applicant: Hamilton Sundstrand Corporation, Charlotte, NC (US)

(72) Inventors: Louis J. Bruno, Ellington, CT (US); Darryl A. Colson, West Suffield, CT (US); Tony Ho, Glastonbury, CT (US); Donald E. Army, Enfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 113 days.

(21) Appl. No.: 17/492,008

(22) Filed: Oct. 1, 2021

(65) Prior Publication Data

US 2023/0105630 A1    Apr. 6, 2023

(51) Int. Cl.
*F02K 3/02*       (2006.01)
*B64D 13/06*      (2006.01)
*F02B 29/04*      (2006.01)
*F02C 9/18*       (2006.01)

(52) U.S. Cl.
CPC ............... *F02K 3/02* (2013.01); *B64D 13/06* (2013.01); *F02B 29/0475* (2013.01); *F02C 9/18* (2013.01); *B64D 2013/0618* (2013.01); *B64D 2013/064* (2013.01); *F05D 2220/323* (2013.01)

(58) Field of Classification Search
CPC ............ B64D 13/06; B64D 2013/0618; B64D 2013/064; B64D 2013/0648; F01D 9/04; F01D 1/023; F02B 37/025
USPC .......................................................... 60/792
See application file for complete search history.

(56) References Cited

U.S. PATENT DOCUMENTS

| | | | |
|---|---|---|---|
| 9,169,024 B2 | 10/2015 | Voinov | |
| 9,254,920 B2 | 2/2016 | Zhou et al. | |
| 10,144,517 B2 | 12/2018 | Bruno et al. | |
| 11,047,237 B2 | 6/2021 | Bruno et al. | |
| 2013/0097994 A1 | 4/2013 | Wang | |
| 2015/0013332 A1 | 1/2015 | Nasir et al. | |
| 2018/0297709 A1 | 10/2018 | Bruno et al. | |
| 2019/0135441 A1* | 5/2019 | Bruno | B64D 13/06 |
| 2019/0389587 A1 | 12/2019 | Bruno et al. | |
| 2020/0217326 A1* | 7/2020 | DeFrancesco | F01D 5/048 |
| 2020/0263568 A1 | 8/2020 | Copeland et al. | |
| 2021/0053687 A1 | 2/2021 | Bruno et al. | |

FOREIGN PATENT DOCUMENTS

CN    106150557 A    11/2016

OTHER PUBLICATIONS

Extended European Search Report for EP Application No. 22197824.0; dated Feb. 15, 2023 (pp. 1-10).

* cited by examiner

*Primary Examiner* — Edelmira Bosques
*Assistant Examiner* — Michael James Giordano
(74) *Attorney, Agent, or Firm* — CANTOR COLBURN LLP

(57) ABSTRACT

A dual entry turbine of a compression device includes a housing having a first inlet and a second inlet, and a first outlet and a second outlet. A turbine impeller is arranged within the housing. The turbine impeller has a first gas path and a second gas path. A first flow path extends from the first inlet to the first outlet via the first gas path and a second flow path extends from the second inlet to the second outlet via the second gas path. The first flow path and the second flow path being fluidly separate from one another.

5 Claims, 3 Drawing Sheets

AMBIENT AIR ENVIRONMENTAL CONTROL SYSTEM

BACKGROUND

Embodiments of the disclosure relate to environmental control systems, and more specifically to an environmental control system of an aircraft.

In general, contemporary air conditioning systems are supplied a pressure at cruise that is approximately 30 psig to 35 psig. The trend in the aerospace industry today is towards systems with higher efficiency. One approach to improve efficiency is to eliminate the use of bleed air entirely and instead use electrical power to compress outside air. A second approach is to use a lower engine pressure air supply to the air conditioning system. A third approach is to use the energy in the bleed air to compress outside air and bring it into the cabin. Unfortunately, each of these approaches provides limited efficiency with respect to engine fuel burn.

BRIEF DESCRIPTION

According to one embodiment, a dual entry turbine of a compression device includes a housing having a first inlet and a second inlet, and a first outlet and a second outlet. A turbine impeller is arranged within the housing. The turbine impeller has a first gas path and a second gas path. A first flow path extends from the first inlet to the first outlet via the first gas path and a second flow path extends from the second inlet to the second outlet via the second gas path. The first flow path and the second flow path being fluidly separate from one another.

In addition to one or more of the features described above, or as an alternative, in further embodiments the second flow path is arranged between the turbine impeller and the first flow path.

In addition to one or more of the features described above, or as an alternative, in further embodiments the first flow path is configured to receive fresh air and the second flow path is configured to receive bleed air.

In addition to one or more of the features described above, or as an alternative, in further embodiments the first flow path is configured to receive bleed air and the second flow path is configured to receive fresh air.

In addition to one or more of the features described above, or as an alternative, in further embodiments comprising a partition disposed within the housing, downstream from the turbine impeller, wherein the partition fluidly separates a portion of the housing into the first outlet and the second outlet.

According to an embodiment, a compression device includes a compressor and a turbine operably coupled to the compressor by a shaft. The turbine further comprises a first flow path extending between a first inlet and a first outlet and second flow path extending between a second inlet and a second outlet. The first flow path and the second flow path are fluidly distinct. The first inlet is configured to receive a first medium and the second inlet is configured to receive a second medium, distinct from the first medium.

In addition to one or more of the features described above, or as an alternative, in further embodiments the second flow path is arranged inside of the first flow path.

In addition to one or more of the features described above, or as an alternative, in further embodiments the first medium is fresh air and the second medium is bleed air.

In addition to one or more of the features described above, or as an alternative, in further embodiments the compressor is located upstream from the turbine relative to a flow of the first medium, the compressor being operable to compress the first medium.

In addition to one or more of the features described above, or as an alternative, in further embodiments the compression device is operable in a plurality of modes, wherein the compressor is configured to receive energy from the first medium and the second medium being expanded across the turbine during a first mode of the compression device and the compressor is configured to receive energy from only the second medium being expanded across the turbine during a second mode of the compression device.

In addition to one or more of the features described above, or as an alternative, in further embodiments the compression device is part of an environmental control system.

In addition to one or more of the features described above, or as an alternative, in further embodiments comprising a fan mounted for rotation with the shaft.

According to an embodiment, an environmental control system includes a compression device having a compressor and a turbine operably coupled by a shaft. The compressor is configured to receive a first medium and the turbine is operable to receive the first medium and a second medium. The turbine has a first flow path configured to receive the first medium and second flow path configured to receive the second medium such that the first medium and the second medium are fluidly separate at an outlet of the turbine.

In addition to one or more of the features described above, or as an alternative, in further embodiments the outlet of the turbine includes a first outlet associated with the first flow path and a second outlet associated with the second flow path, the first outlet being fluidly coupled to a first component of the environmental control system and the second outlet being fluidly coupled to a second component of the environmental control system.

In addition to one or more of the features described above, or as an alternative, in further embodiments comprising a ram air circuit having at least one heat exchanger, wherein the first outlet is fluidly connected to a system outlet, and the second outlet is fluidly connected to the ram air circuit.

In addition to one or more of the features described above, or as an alternative, in further embodiments comprising a fan operably coupled to the shaft, the fan being arranged in fluid communication with a portion of the ram air circuit.

In addition to one or more of the features described above, or as an alternative, in further embodiments the environmental control system is operable in a first mode and a second mode, in the first mode, energy is extracted from both the first medium and the second medium within the turbine, and in the second mode, energy is extracted form only the second medium in the turbine.

In addition to one or more of the features described above, or as an alternative, in further embodiments the first flow path is arranged outside the first flow path.

In addition to one or more of the features described above, or as an alternative, in further embodiments the first medium is fresh air and the second medium is bleed air.

In addition to one or more of the features described above, or as an alternative, in further embodiments the first medium is bleed air and the second medium is fresh air.

Additional features and advantages are realized through the techniques of the embodiments herein. Other embodiments are described in detail herein and are considered a part of the claims. For a better understanding of the embodiments with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages thereof are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the FIGS.

Embodiments herein provide an environmental control system of an aircraft that receives multiple mediums from different sources and uses energy from one or more of the mediums to operate the environmental control system and to provide cabin pressurization and cooling at a high fuel burn efficiency. The mediums described herein are generally types of air; however, it should be understood that other mediums, such as gases, liquids, fluidized solids, or slurries are also contemplated herein.

Figure 1:
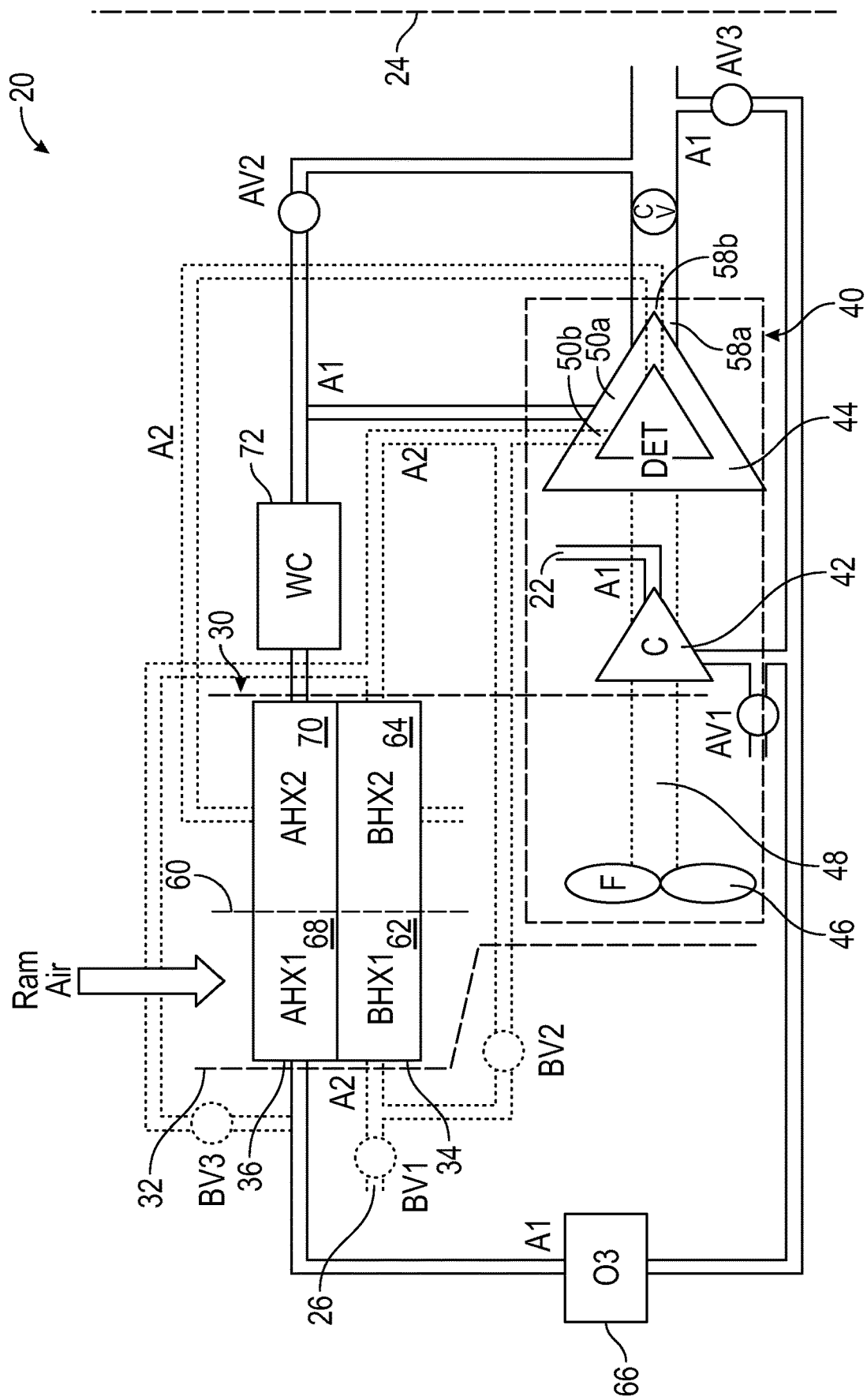
FIG. 1 is a schematic diagram of an environmental control system according to an embodiment.

With reference now to FIG. 1, a schematic diagram of an environment control system (ECS) 20 is depicted according to a non-limiting embodiment. It should be understood that the ECS 20 illustrated and described herein may also be an "ECS pack" that forms a part of a larger environmental control system. Although the environmental control system 20 is described with reference to an aircraft, alternative applications are also within the scope of the disclosure. As shown in the FIG., the ECS 20 can receive a first medium A1 at a first inlet 22 and provide a conditioned form of only the first medium A1 at a system outlet, such as for delivery to a volume or cabin 24. In embodiments where the ECS 20 is used in an aircraft application, the first medium A1 is fresh or outside ambient air. The outside air can be procured via one or more scooping mechanisms, such as an impact scoop or a flush scoop for example. Generally, the first medium A1 described herein is at an ambient pressure equal to an air pressure outside of the aircraft when the aircraft is on the ground and is between an ambient pressure and a cabin pressure when the aircraft is in flight.

The ECS 20 is configured to receive a second medium A2 at an inlet 26. In one embodiment, the second medium A2 is bleed air. As used herein, the term "bleed air" includes pressurized air originating from i.e., being "bled" from, an engine or auxiliary power unit of the aircraft. It shall be understood that one or more of the temperature, humidity, and pressure of the bleed air may vary based upon the compressor stage and revolutions per minute of the engine or auxiliary power unit from which the air is drawn. For example, bleed air may be drawn from either a low pressure compressor spool or a high pressure compressor spool of an engine, and bleed air drawn from the low pressure compressor spool will have a relatively lower pressure than bleed air drawn from the high pressure compressor spool. In some embodiments, the ECS 20 is configured to extract work from the second medium A2. In this manner, the pressurized air A2 can be utilized by the ECS 20 to achieve certain operations.

The ECS 20 includes a RAM air circuit 30 including a shell or duct 32 within which at least one heat exchanger is located. The shell 32 can receive and direct a medium, such as ram air for example, through a portion of the ECS 20. The one or more heat exchangers are devices built for efficient heat transfer from one medium to another. Examples of the type of heat exchangers that may be used, include, but are not limited to, double pipe, shell and tube, plate, plate and shell, adiabatic shell, plate fin, pillow plate, and fluid heat exchangers.

The one or more heat exchangers arranged within the shell 32 may be referred to as ram heat exchangers. In the illustrated, non-limiting embodiment, the ram heat exchangers include a first or primary heat exchanger 34 and a second or secondary heat exchanger 36. Within the heat exchangers, a flow of air, such as ram or outside air for example, acts as a heat sink to cool a medium passing there through, for example the second medium A2. The secondary heat exchanger 36 may be located upstream from the primary heat exchanger 34 such that the temperature of the air provided to the primary heat exchanger 34 is higher (warmer) than the temperature of the air provided to the secondary heat exchanger 36. It should be understood that a ram air circuit 30 having any number and configuration of heat exchangers is contemplated herein.

The ECS 20 additionally comprises at least one compression device 40. In the illustrated, non-limiting embodiment, the compression device 40 of the ECS 20 is a mechanical device that includes components for performing thermodynamic work on a medium (e.g., extracts work from or applies work to the first medium A1 and/or the second medium A2 by raising and/or lowering pressure and by raising and/or lowering temperature.) Examples of the compression device 40 include an air cycle machine, a three-wheel air cycle machine, a four-wheel air cycle machine, etc. . . .

As shown, the compression device 40 includes a compressor 42, a turbine 44 and a fan 46 operably coupled to one another via a shaft 48. The compressor 42 is a mechanical device that raises a pressure of a medium provided thereto and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. As shown, the compressor 42 is configured to receive and pressurize the first medium A1.

A turbine 44 is a mechanical device that expands a medium and extracts work therefrom (also referred to as extracting energy). In the compression device 40, the turbine 44 drives the compressor 42 and the fan 46 via the shaft 48. In the illustrated, non-limiting embodiment, the turbine 44 is a dual entry turbine that includes a plurality of distinct fluid flow paths, such as a first or outer flow path and a second or inner flow path configured to receive distinct mediums. In an embodiment, the first flow path is a first diameter and the second flow path is a second diameter. Because the second flow path is arranged concentrically between a turbine impeller 52 and the first flow path, the second diameter is smaller than the first diameter.

Further, the turbine 44 may include a first nozzle 50a configured to accelerate a medium for entry into a turbine impeller 52 and a second nozzle 50b configured to accelerate a medium for entry into the turbine impeller 52. As a result, the turbine impeller 52 can be configured with a first gas path fluidly coupled to and that forms part of the first flow path and a second gas path fluidly coupled to and that forms part of the second flow path. In the illustrated, non-limiting embodiment of FIG. 2, the first medium A1 is provided to the first flow path via the first nozzle 50a and the second medium A2 is provided to the second flow path via the second nozzle 50b. However, embodiments where the first medium A1 is provided to the second flow path and the second medium A1 is provided to the first flow path of the dual entry turbine 44, as shown in FIG. 3, are also contemplated herein.

Figure 2:
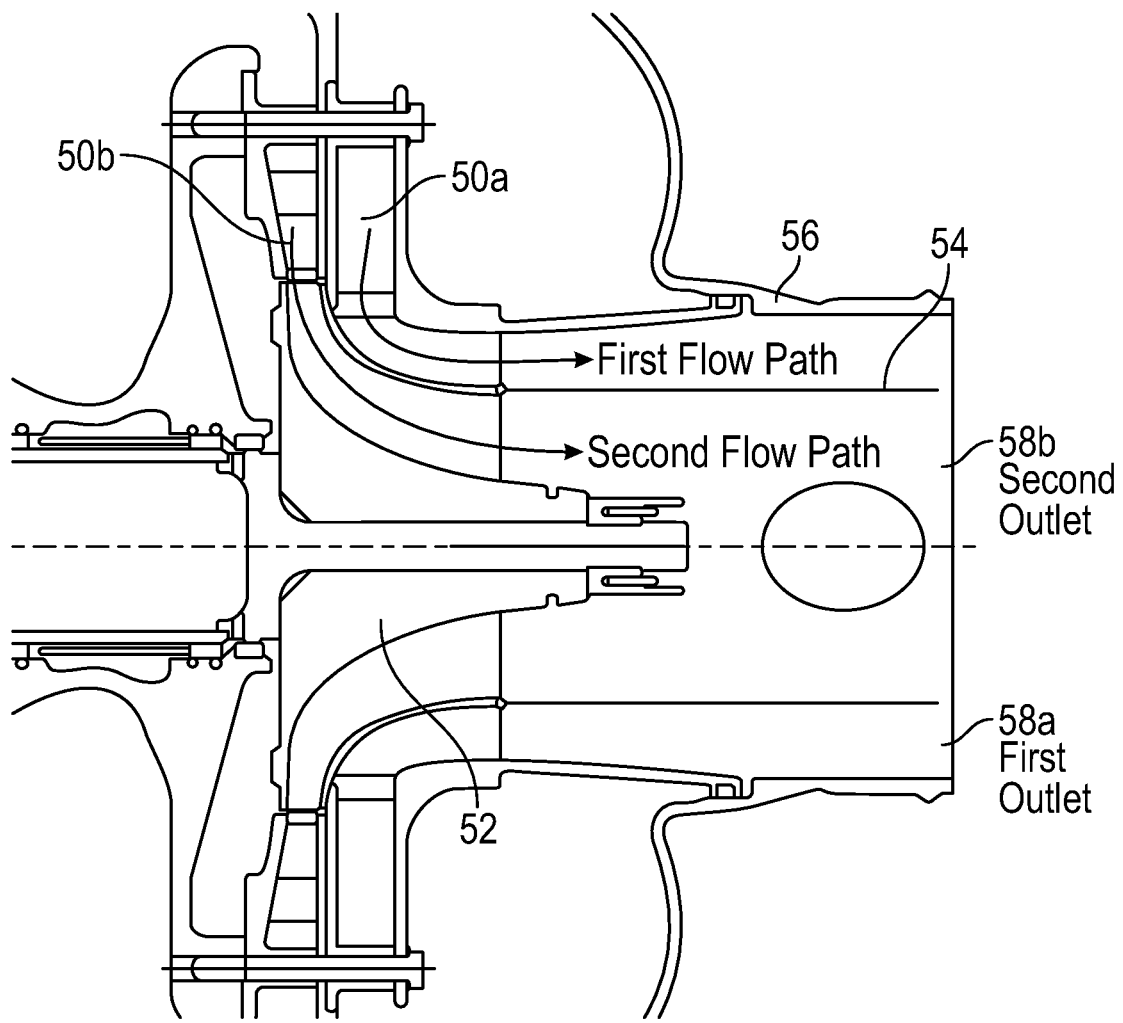
FIG. 2 is a detailed cross-sectional view of a portion of a turbine of a compression device of the environmental control system according to an embodiment.
Figure 3:
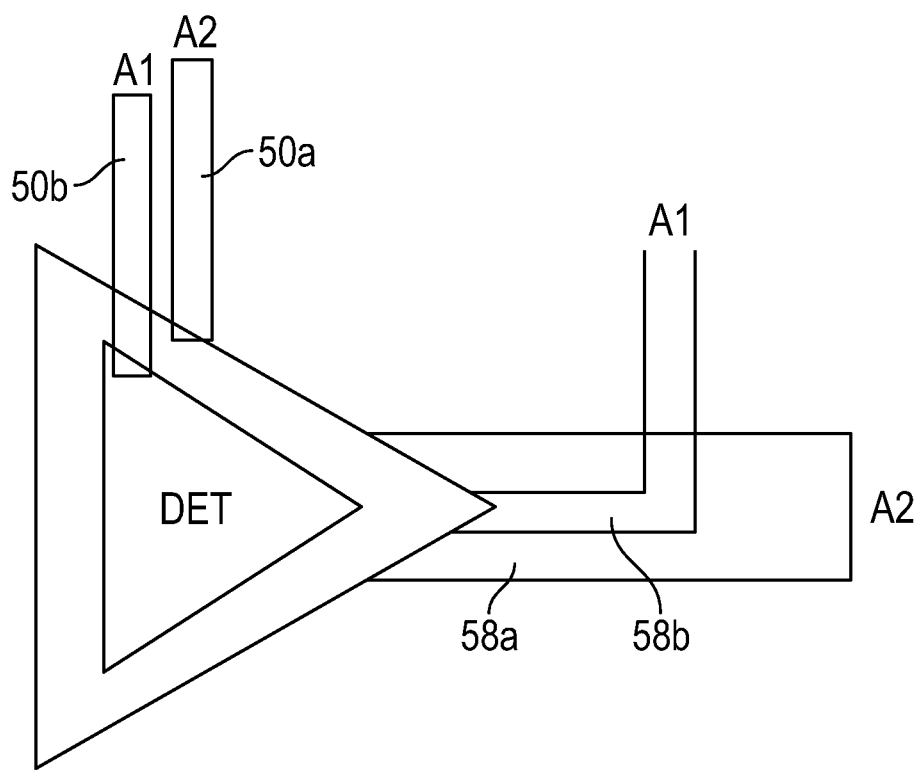
FIG. 3 is a schematic diagram of a turbine of the compression device of the environmental control system according to another embodiment.

In an embodiment, best shown in FIG. 2, the turbine 44 includes a partition 54 arranged within the turbine housing 56, downstream of the turbine impeller 52. The partition 54 maintains the separation between the first flow path/first gas path and the second flow path/second gas path downstream from the turbine impeller 44. Accordingly, the two fluids provided to the turbine 44 remain fluidly distinct or fluidly separate as they pass from the inlet or nozzles 50a, 50b to the outlet of the turbine 44. A first outlet 58a of the turbine 44 associated with the first gas path of the turbine impeller 52 is connected to a first component of the ECS 20 via a first conduit and the second outlet 58b of the turbine 44 associated with the second gas path of the turbine impeller 52 is connected to a distinct second component of the ECS 20 via a second conduit.

Although not shown, in an embodiment, the compression device 40 could include another turbine, for example mounted to the shaft between the compressor and the fan. In such embodiments the another turbine is configured to receive a medium, such as a separate flow of the first medium, or alternatively, a third medium. An example of a suitable third medium is cabin discharge air, which is air leaving the volume 24 and that would typically be discharged overboard. Energy extracted from the medium within the another turbine would similarly be used to drive the compressor 42 and the fan 46 via the shaft 48.

The fan 46 is a mechanical device that can force, via push or pull methods, a medium (e.g., ram air) across the one or more heat exchangers 34, 36 and at a variable cooling to control temperatures. Although the fan 46 is illustrated and described herein as part of the compression device 40, it should be understood that in other embodiments, the fan 46 may be separate from the compression device 40 and driven by any suitable mechanism, such as an electric motor for example.

The elements of the ECS 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the system can be regulated to a desired value. For instance, a first valve BV1 is configured to control a supply of the second medium A2 provided to the ECS 20. A second valve BV2 may be operable to allow a portion of a medium, such as the first medium A1, to bypass one or more heat exchangers, such as the primary heat exchanger of the ram air circuit 30. As a result, operation of the second valve BV2 may be used to add heat and to drive the compression device 40 during failure modes. Another valve, AV1 may be a surge control valve, operable to exhaust a portion of the first medium A1 output from the compressor 42 overboard or into the ram air circuit 30 to prevent a compressor surge. Further, valve AV2 may be operable to allow a supply of a medium, such as the first medium A1 for example, to bypass the turbine 44 of the compression device 40 and valve AV3 may be operable to allow all or at least a portion of the first medium A1 to bypass the remainder of the ECS 20.

With continued reference to FIG. 1, the ECS 20 is operable in a plurality of modes, selectable based on a flight condition of the aircraft. For example, the ECS 20 may be operable in a first mode, also referred to herein as a "low-altitude mode" or a second mode, also referred to herein as a high-altitude mode." The first, low-altitude mode is typically used for ground and low-altitude flight conditions, such as ground idle, taxi, take-off, and hold conditions, and the second, high-altitude mode may be used at high altitude cruise, climb, and descent flight conditions.

During operation in the first, low-altitude mode, a flow of the first medium A1, and a flow of the high pressure second medium A2, such as bleed air drawn from an engine or auxiliary power unit, are both provided to the ECS 20. From the inlet 26, the second medium A2 is provided to the primary heat exchanger 34. As shown, the primary heat exchanger 34 may be separated by a divider 60 into a first portion 62 and a second portion 64, respectively. In the illustrated, non-limiting embodiment, the second medium A2 is provided to the first portion 62 and the second portion in series. However, it should be understood that in other embodiments, the second portion 64 may be located upstream from the first portion 62 relative to the flow of the second medium A2. In the first, low-altitude mode, within the first portion 62 of the primary heat exchanger 34, the second medium A2 is cooled via a flow of ram air, driven through the ram air duct on one side of the divider 60 by the fan 46 of the compression device 40. In the second portion 64 of the primary heat exchanger 34, the second medium A2 is cooled by a flow of the second medium A2 output from the compression device 40, to be described in more detail below.

With continued reference to FIGS. 1 and 2, from the primary heat exchanger 34, the second medium A2 is provided directly to the turbine 44 of the compression device 40. In an embodiment, the second medium A2 is provided to the second nozzle 50b and corresponding second flow path of the turbine 44. Within the turbine 44, the high pressure second medium A2 is expanded and work is extracted therefrom. The second medium A2 output from the second outlet 58b of the turbine 44 has a reduced temperature and pressure relative to the second medium A2 provided to the second inlet 50b of the turbine 44.

The second medium A2 output from the turbine 44 is then provided to the ram air circuit 30. In the illustrated, non-limiting embodiment, this cooled flow of the second medium A2 output from the compression device 40 is exhausted into the ram air duct 32 on an opposite side of the divider 60 as the ram air such that the ram air and the second medium A2 do not mix upstream from the heat exchangers 34, 36. This second medium A2 within the ram air duct 32 is used to cool the flow of second medium A2 within the first portion 62 of the primary heat exchanger 34 before being exhausted overboard.

The work extracted from the second medium A2 in the turbine 44 drives the compressor 42, which is used to compress the first medium A1 provided from the inlet 22. The first medium A1, such as fresh air for example, may be drawn from any suitable source including an upstream end of the ram air circuit 30 or from another source and provided to an inlet of the compressor 42. The act of compressing the first medium A1, heats and increases the pressure of the first medium A1.

The first medium A1 is configured to flow from an outlet of the compressor 42 to the secondary heat exchanger 36. The first medium A1 may, but need not pass through an ozone converter 66 upstream from the secondary heat exchanger 36. As shown, the secondary heat exchanger 36 may also be separated by the divider 60 into a first portion 68 and a second portion 70, respectively. In the illustrated, non-limiting embodiment, the first medium A1 is provided to the first portion 68 and the second portion 70 of the secondary heat exchanger 36 in series. However, embodiments where the first portion 68 is arranged downstream from the second portion 70 relative to the flow of the first medium A1 are also contemplated herein.

In the first, low-altitude mode, the first medium A1 within the first portion 68 of the secondary heat exchanger 36 is cooled by a flow of ram air, driven by the fan 46 of the compression device 40. As shown, the first portion 68 of the secondary heat exchanger 36 is arranged upstream from the first portion 62 of the primary heat exchanger 34 relative to the flow of ram air through the ram air duct 32. The cooler first medium A1 is then provided to the second portion 70 of the secondary heat exchanger 36 where the flow is further cooled by the flow of second medium A2 output from the compression device 40. The second portion 70 of the secondary heat exchanger 36 is arranged upstream from the second portion 64 of the primary heat exchanger 34 relative to the flow of the first medium A1 output from the compression device 40 into the ram air duct 32. It should be noted that the divider 60 may extend beyond the heat exchangers 34, 36 such that the flow of ram air and the flow of the second medium A2 output from the compression device 40 remain generally separate over the length of the ram air duct 32. However, in other embodiments, the ram air and the flow of the second medium A2 output from the compression device 40 may be configured to mix at a location downstream from the ram air heat exchangers.

From the secondary heat exchanger 36, the flow of cool first medium A1 may be provided to a water collector or extractor 72. The water extractor 72 is a mechanical device that performs a process of removing water from a medium. As shown, the water extractor 72 is arranged directly downstream from an outlet of the second portion 70 of the primary heat exchanger 34. In such embodiments the second portion 70 of the primary heat exchanger 34 is configured to function as a condenser.

From the water extractor 72, the first medium A1 is provided to the turbine 44 of the compression device 40. In an embodiment, the first medium A1 is provided to the first flow path of the turbine 44 via the first nozzle 50a. Within the turbine 44, first medium A1 is expanded and work is extracted therefrom. As shown, the work extracted from the first medium A1 within turbine 44 may be used to drive rotation of the compressor 42 and the fan 46 via the shaft 48. The cooler, lower pressure first medium A1 provided at the first outlet 58a of the turbine 44 may then be provided to one or more loads, such as to the cabin 24 for example, via an outlet of the system. Accordingly, in the first mode of the ECS 20, energy extracted from both the first medium A1 and the second medium A2 within the turbine 44 is used to drive the compressor 42 and the fan 46.

With continued reference to FIG. 1, the high-altitude mode of operation is similar to the low-altitude mode of operation. However, in some embodiments, valve BV2 may be opened to allow at least a portion of the second medium A2 to bypass the primary heat exchanger 34. Valve BV2 may be operated to control, and in some embodiments, maximize the temperature of the second medium A2 provided to the compression device 40. As a result, the work extracted from the second medium A2 within the turbine 44 may be optimized while exhausting the second medium A2 therefrom with a temperature suitable to function as a heat sink with respect to the second portions 64, 70 of the primary and secondary heat exchangers 34, 36. However, the remainder of the flow path of the second medium A2 when the ECS 20 is in the high-altitude mode is substantially identical to the flow path of the second medium A2 in the low-altitude mode.

The flow of the first medium A1 may also be similar in both the low-altitude mode and the high-altitude mode. However, in an embodiment, in the second, high-altitude mode of operation, valve AV2 is open such that the second medium A2 bypasses the turbine 44 of the compression device. In such embodiments, the first medium A1 as conditioned at the outlet of the secondary heat exchanger 36 or the water extractor 72 is provided to the one or more loads of the aircraft, such as the cabin 24 for example. Further, because the first medium A1 bypasses the turbine 44, rotation of the shaft 48, and therefore operation of the fan 46 and the compressor 42 are driven solely by the energy extracted from the second medium A2 in the high-altitude mode.

The ECS 20, and particularly the compression device 40 illustrated and described herein has a reduced size compared to other environmental control systems configured to deliver solely fresh or ambient air to the cabin during normal operation.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of embodiments herein. For instance, the steps may be performed in a differing order or steps may be added, deleted or modified. All of these variations are considered a part of the claims.

While the preferred embodiment has been described, it will be understood that those skilled in the art, both now and in the future, may make various improvements and enhancements which fall within the scope of the claims which follow. These claims should be construed to maintain the proper protection.

What is claimed is:

1. An environmental control system comprising:
a compression device including a compressor and a turbine operably coupled by a shaft, the compressor being configured to receive a first medium and the turbine being operable to receive the first medium and a second medium;
wherein the turbine has a first flow path configured to receive the first medium and second flow path configured to receive the second medium such that the first medium and the second medium are fluidly separate at an outlet of the turbine,
wherein the first flow path is arranged outside the second flow path, the first medium is bleed air and the second medium is fresh air.

2. The environmental control system of claim 1, wherein the outlet of the turbine includes a first outlet associated with the first flow path and a second outlet associated with the second flow path, the first outlet being fluidly coupled to a first component of the environmental control system and the second outlet being fluidly coupled to a second component of the environmental control system.

3. The environmental control system of claim 2, further comprising:
a ram air circuit having at least one heat exchanger;
wherein the first outlet is fluidly connected to a system outlet, and the second outlet is fluidly connected to the ram air circuit.

4. The environmental control system of claim 3, further comprising a fan operably coupled to the shaft, the fan being arranged in fluid communication with a portion of the ram air circuit.

5. The environmental control system of claim 1, wherein the environmental control system is operable in a first mode and a second mode, in the first mode, energy is extracted from both the first medium and the second medium within the turbine, and in the second mode, energy is extracted from only the second medium in the turbine.

* * * * *